Aug. 1, 1939.  C. W. COSEBOOM  2,167,876
PATTY-FORMING MACHINE
Filed March 14, 1938    2 Sheets-Sheet 1
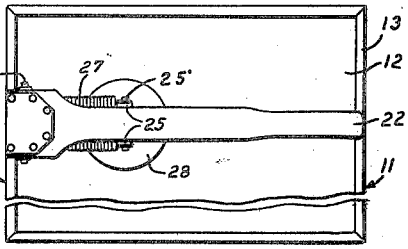
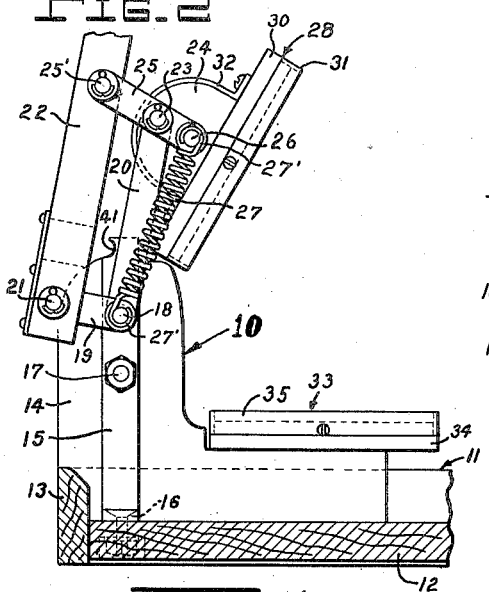
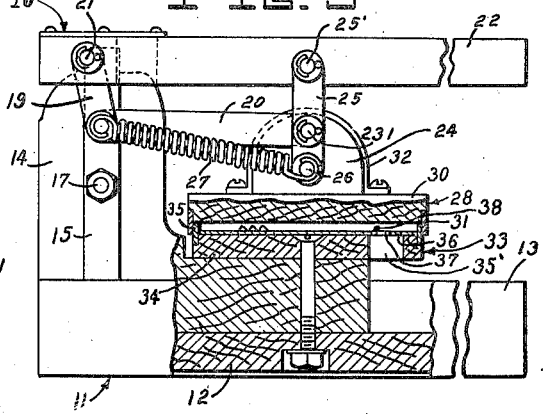
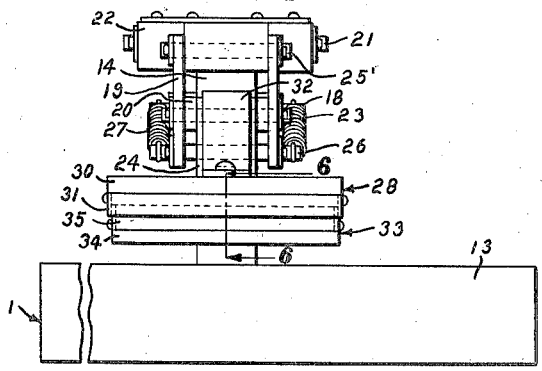
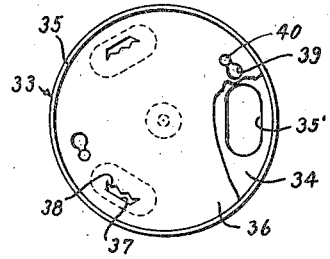
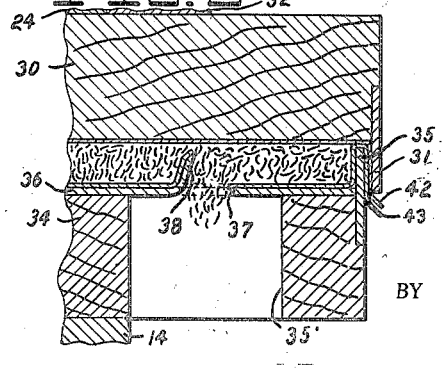
INVENTOR.
C. W. COSEBOOM
BY
ATTORNEY.

Aug. 1, 1939.　　　C. W. COSEBOOM　　　2,167,876
PATTY-FORMING MACHINE
Filed March 14, 1938　　　2 Sheets-Sheet 2
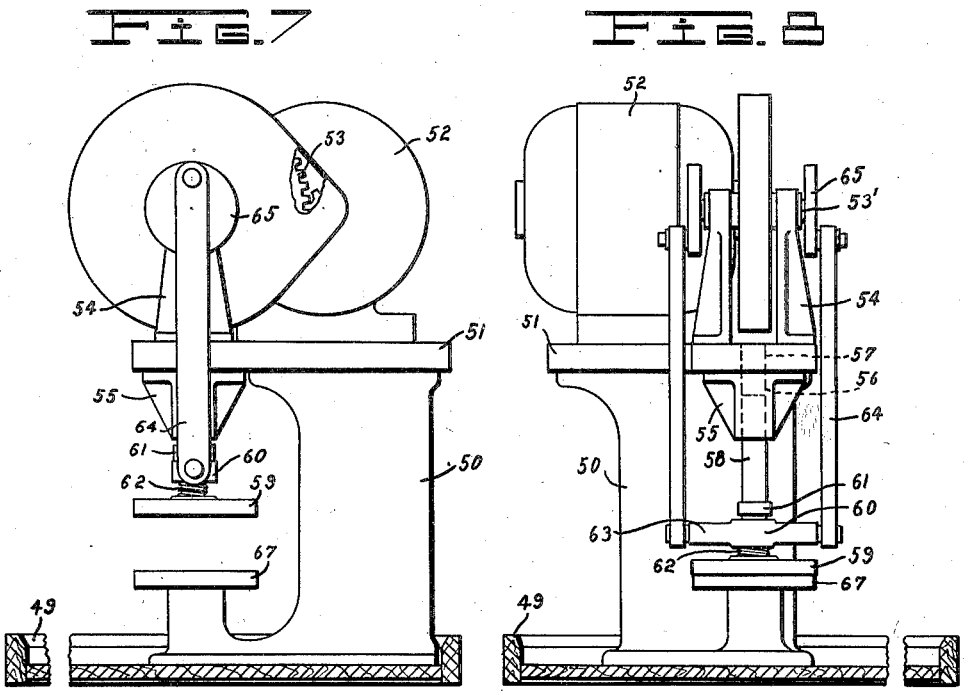
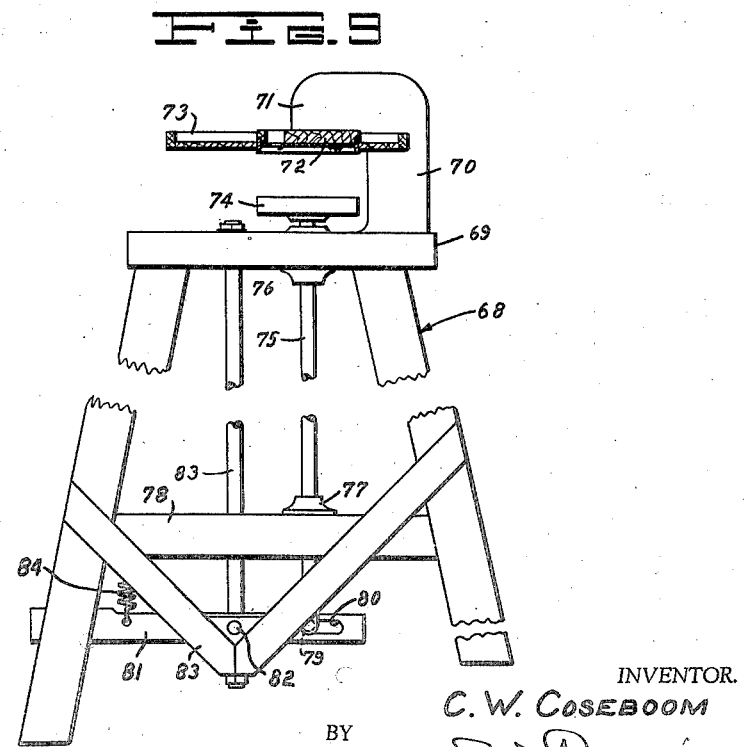
INVENTOR.
C. W. COSEBOOM
BY
ATTORNEY.

Patented Aug. 1, 1939

2,167,876

UNITED STATES PATENT OFFICE 2,167,876

PATTY-FORMING MACHINE

Claude W. Coseboom, Altadena, Calif., assignor of one-half to James W. Beasley, East San Gabriel, Calif.

Application March 14, 1938, Serial No. 195,683

7 Claims. (Cl. 107—15)

This invention relates to improvements in patty forming machines.

The general object of the invention is to provide a novel patty forming machine.

A more specific object of the invention is to provide a machine which is particularly adapted for use in manufacturing hamburgers and is so designed that it will evenly distribute the meat and provide a hamburger of a desired weight.

Another object of the invention is to provide a hamburger forming machine having novel means whereby the surplus meat is discharged without waste.

Other objects and the advantages of my invention will be apparent from the following description taken in connection with the accompanying drawings, wherein:

Fig. 1 is a top plan view of a patty forming apparatus embodying the features of my invention;

Fig. 2 is a fragmentary elevation, partly in section, showing the handle in the raised position;

Fig. 3 is a fragmentary elevation, partly in section, showing the handle in the down position;

Fig. 4 is an end view;

Fig. 5 is a top plan view of the lower mold member with parts broken away;

Fig. 6 is an enlarged section taken on line 6—6 of Fig. 4;

Fig. 7 is a side elevation, partly in section, showing a modification of my invention;

Fig. 8 is a front elevation, partly in section, of the modification shown in Fig. 7; and Fig. 9 is a side elevation, partly in section, of a further modification of my invention.

Referring to the drawings by reference characters I have shown my invention as embodied in a patty forming machine which is indicated generally at 10. As shown the patty forming machine includes a base 11 which comprises a bottom 12 and rail members 13 which form a receptacle for the ground meat.

An upright support 14 is mounted on the base 11 being engaged by a pair of brackets 15 which are in turn secured to the bottom 12 by bolts 16. Each of the brackets 15 is secured to the upright support 14 by a bolt 17.

A shaft 18 extends through the upright support 14 and bracket 15. One end of a pair of arms 19 and one end of a pair of arms 20 are pivotally mounted on the shaft 18. The other ends of the arms 19 are pivotally mounted on a shaft 21 which extends through a handle member 22 to thus pivotally support the handle member. The other ends of the arms 20 are mounted on a shaft 23 which extends through a block 24.

The shaft 23 supports a link 25 which has one end pivotally mounted on a shaft 25' on the handle 22 and has the other end mounted on the shaft 26 which extends through the block 24. Thus the lever arms 25 are maintained in the same relation to the block 24 by the shafts 23 and 26 when the handle 22 is rotated.

In order to urge the shafts 18 and 26 towards each other I provide springs 27 which have their ends 27' surrounding the respective shafts.

An upper mold member 28 comprising a base 30 and a peripheral flange 31 is mounted on the block 24 by means of a stirrup member 32. Mounted upon the bracket 14 I show a lower mold member 33 which includes a base portion 34 and a peripheral flange 35 which fits within the flange 31 on the upper mold member. The lower mold member bottom is provided with spaced apertures 35' and the lower mold member includes a false bottom 36 which is removable and which includes apertures 37 having teeth 38 adjacent the edge thereof.

The false bottom 36 includes slots 39 which engage pins 40 to hold the bottom 36 in place. By rotating the bottom 36 the pins assume a position in the enlarged ends of the slots 39, thus enabling the bottom 36 to be removed.

The construction is such that when the handle member 22 is rotated the mold members are brought together into the position shown in Fig. 3, where it will be noted the shaft 21 engages in a notch 41 on the bracket 15 before the mold members engage. Thereafter further movement of the handle causes a downward movement of the upper mold member 28 to the position shown in Fig. 3.

In operation the ground meat is placed between two sheets of wax paper 42 and 43 (see Fig. 6) and placed on the lower mold member 23. The handle 22 is then moved downwardly, thus moving the mold member 28 towards the mold member 33. The extended peripheral member 31 of the upper mold 28 telescopes over the corresponding peripheral member 35 of the mold 33.

The handle 22 is depressed until the shaft 21 comes into contact with the notch 41 on the bracket 15, thus limiting the forward motion of the mold member 28 and causing a straight downward motion until the base 30 contacts the upwardly extending peripheral member 35 on the lower mold member 33. The material is thus evenly distributed and surplus is discharged through the apertures 37 in the bottom 36 and through the apertures 35' in the mold base 34.

When the material is being pressed the teeth 38 cut holes in the wax paper, thus providing apertures through which the surplus material is discharged. The handle 22 is then raised, allowing the formed patty to be readily removed.

In Figs. 7 and 8 I show a modification of my invention wherein I provide a base 49 having a standard 50 thereon. The standard includes an upper plate 51 on which I arrange a motor 52 which drives a gear 53 which is mounted on a shaft 53' supported on supports 54 on the plate 51.

I provide a downwardly extending support 55 having a central aperture 56 which is in alignment with an aperture 57 in the plate 51. A guide shaft 58 is slidably mounted in the aperture 56. The lower end of the shaft 58 is provided with a fixed mold member 59 which is similar to the mold member 28. A sleeve 60 is slidably mounted on the shaft 58 below a collar 61 which limits the upward motion of the sleeve 60 relative to the shaft 58 and a spring 62 is positioned on the shaft 58 between the mold member 59 and the sleeve 60.

The sleeve 60 is provided with opposed bosses 63 which have links 64 pivotally mounted on each end thereof. The upper ends of the links 64 are eccentrically mounted on disks 65 which are in turn secured on the shaft 53' on which the gear 53 operates.

A fixed lower mold member 67, which is similar to the lower mold member 33 previously described, is provided in alignment with the mold member 59 on the standard 50.

In operation the motor is started, causing the gear 53 and the disks 65 to be rotated, thus raising and lowering the links 64 and the upper mold member 59 and thereby compressing the material into patties of uniform weight and thickness and squeezing out the surplus material.

The support 70 includes an overhanging portion 71 on which a mold member 72, which is similar to the mold member 33 previously described, is fixed. I provide a platform 73 around the mold member 72. A second mold member 74, which is similar to the mold member 28 previously described, is disposed in alignment with the mold member 72 and is supported on a shaft 75. The shaft 75 extends through a bushing 76 in the platform 69 and a bushing 77 in a platform 78 which is fixed on the lower end of the standard 68.

The lower end of the shaft 75 is provided with a pin 79 which extends through an elongated slot 80 in a foot lever 81. The foot lever 81 is pivoted as at 82 on supports 83 which are fixed to the standard 68 and the upper platform 69. A spring 84 is provided near the outer end of the foot lever 81 to hold the lower mold member 74 in the down position.

In operation the material is placed between an upper and a lower sheet of paper and is arranged over the lower mold member 74 and pressure is applied to the foot lever 81, thus raising the mold member 74 by means of the shaft 75, thus compressing the material into a patty of uniform weight and thickness and squeezing out the surplus material.

From the foregoing description it will be apparent that I have invented a novel patty forming machine which can be economically manufactured and which is highly efficient for the intended purpose.

Having thus described my invention I claim:

1. In a patty forming apparatus, a base, a mold member on said base, said mold member comprising a disk, a peripheral member on said disk and extending thereabove, a second mold member, means to mount said second mold member to move towards the first mold member, said second mold member including a disk having a peripheral member thereon telescoping the peripheral member on the first disk, one of said disks having apertures therein, and a plate removably engaging the top of said one disk, said plate having apertures therein and having serrated edges adjacent said apertures, said serrated edges being disposed above the disk apertures.

2. In a patty forming apparatus, a base having an upright thereon, a mold member fixed on said base, said mold member comprising a disk, a peripheral member on said disk and extending thereabove, an arm on said upright, a mold member mounted on said arm, said second mold member including a disk having a peripheral member thereon telescoping the peripheral member on the first disk, said first disk having apertures therein, and a plate removably engaging the top of said second disk, said plate having apertures therein and having serrated edges adjacent said apertures, said serrated edges being disposed above the disk apertures.

3. In a patty forming apparatus, a base having an upright thereon, a mold fixed on said base, said mold comprising a disk, a peripheral member on said disk and extending thereabove, an arm on said upright, a pair of links mounted on said arm, a handle mounted on said links, a second pair of links pivotally mounted on said arm, a third pair of links pivotally mounted on said second pair of links and engaging said lever, and a mold member mounted on said third pair of links, said second mold member including a disk having a peripheral member thereon telescoping over the peripheral member on the first disk.

4. In a patty forming apparatus, a base having a bracket thereon, a mold fixed on said base, a platform surmounting said bracket, upright supports on said platform, a shaft on said supports, disks secured on both ends of said shafts, links having one end eccentrically and rotatably mounted on said disks, a shaft slidably mounted on said platform, a sleeve on said shaft, the opposite ends of said links being pivotally mounted on said sleeve, means on the shaft to limit the upward motion of the sleeve, a mold member fixed on the lower end of said second shaft, and a spring operable between said second mold member and said sleeve, said second mold member being in alignment with said first mentioned mold member.

5. In a patty forming apparatus, a standard, a platform surmounting said standard, a support on said platform, said support including an overhanging portion, a mold member fixed on the lower side of said overhanging portion, said mold member including discharge apertures, a tray surrounding said mold member, a second mold member, a shaft on which said second mold member is mounted, means to slidably support said shaft on said platform, and a foot operated lever pivotally mounted on said standard, said foot operated lever having means thereon engaging said shaft.

6. In a patty forming apparatus, a mold on said base, said mold member comprising a disk, a peripheral member on said disk and extending therabove, a second mold member, means to mount said mold members for relative movement towards and from each other, said second mold member including a disk having a peripheral member thereon telescoping the peripheral member on the first disk, one of said disks having apertures therein, a plate removably engaging the top of said one disk, said plate having apertures therein and having serrated edges adjacent said apertures, said serrated edges being disposed adjacent to the disk apertures.

7. In a patty forming apparatus, a base having an upright thereon, a mold member fixed on said base, said mold member including a disk having a peripheral portion extending therefrom, an arm on said upright, means to shift said arm, a mold member mounted on said arm, said second mold member including a portion telescoping the peripheral member on said disk, one of said mold members having an aperture therethrough, said one mold member having a cutting edge adjacent said aperture.

CLAUDE W. COSEBOOM.